United States Patent
Muthiah

(10) Patent No.: US 11,575,959 B2
(45) Date of Patent: Feb. 7, 2023

(54) STORAGE SYSTEM AND METHOD FOR MEDIA-BASED FAST-FAIL CONFIGURATION

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 339 days.

(21) Appl. No.: 16/889,416

(22) Filed: Jun. 1, 2020

(65) Prior Publication Data

US 2021/0377590 A1    Dec. 2, 2021

(51) Int. Cl.
| | |
|---|---|
| H04N 21/43 | (2011.01) |
| H04L 65/80 | (2022.01) |
| G06F 11/07 | (2006.01) |
| H04N 21/24 | (2011.01) |

(52) U.S. Cl.
CPC ..... *H04N 21/4305* (2013.01); *G06F 11/0757* (2013.01); *H04L 65/80* (2013.01); *H04N 21/2404* (2013.01); *G06F 2201/81* (2013.01)

(58) Field of Classification Search
CPC ........... H04N 21/4305; H04N 21/2404; G06F 11/0757; G06F 2201/81; H04L 65/80
See application file for complete search history.

(56) References Cited

U.S. PATENT DOCUMENTS

| | | | |
|---|---|---|---|
| 5,598,352 A | 1/1997 | Rosenau et al. | |
| 7,471,337 B2 | 12/2008 | Wells et al. | |
| 10,108,481 B1* | 10/2018 | Kataria | G06F 11/0793 |
| 2010/0064316 A1 | 3/2010 | Dai et al. | |
| 2011/0129194 A1* | 6/2011 | Nakao | H04N 21/4302 386/E5.032 |
| 2011/0187927 A1 | 8/2011 | Simon | |
| 2017/0006331 A1* | 1/2017 | Jairath | H04N 21/4305 |
| 2018/0376105 A1* | 12/2018 | Davies | H04N 21/4341 |
| 2019/0238158 A1* | 8/2019 | Bhatia | G06F 11/1068 |
| 2019/0278653 A1* | 9/2019 | Padilla, Jr. | G06F 11/3037 |

OTHER PUBLICATIONS

"Audio-to-video synchronization"; Wikipedia entery; downloaded from the Internet at https://en.wikipedia.org/wiki/Audio-to-video_synchronization on Sep. 16, 2019; 3 pages.

* cited by examiner

*Primary Examiner* — Randy A Flynn
(74) *Attorney, Agent, or Firm* — Crowell & Moring LLP

(57) ABSTRACT

A storage system and method for media-based fast-fail configuration are provided. In one embodiment, the storage system aggregates elapsed time spent handling errors in parts of a media frame read from the memory of the storage system. The storage system compares the aggregated elapsed time to a threshold representing a total acceptable latency. If the aggregated elapsed time does not exceed the threshold, the storage system handles error(s) in other part(s) of the media frame read from the memory. However, if the aggregated elapsed time exceeds the threshold, the storage system sends an error to a host without handling error(s) in other part(s) of the media frame read from the memory. Other embodiments are provided.

20 Claims, 6 Drawing Sheets

STORAGE SYSTEM AND METHOD FOR MEDIA-BASED FAST-FAIL CONFIGURATION

BACKGROUND

A host can send read and write requests to a storage system to read data from and store data in a memory of the storage system. The host can also be used to playback audio/video information stored in the memory of the storage system.

DETAILED DESCRIPTION

Overview

Figure 1A:
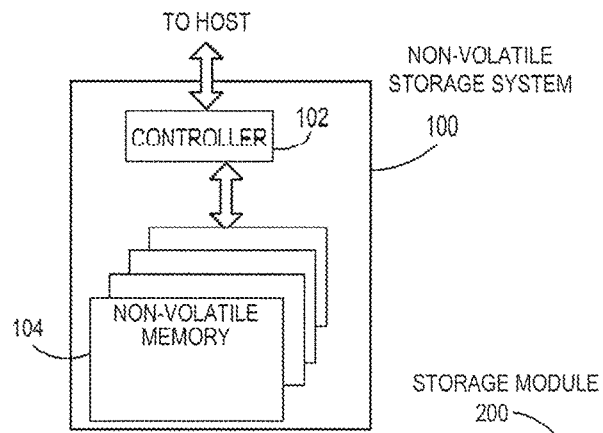
FIG. 1A is a block diagram of a non-volatile storage system of an embodiment.

By way of introduction, the below embodiments relate to a storage system and method for media-based fast-fail configuration. In one embodiment, a storage system is provided comprising a memory and a controller. The controller is configured to read a media frame stored in the memory; determine an elapsed time spent handling an error in a part of the media frame read from the memory; aggregate the determined elapsed time with previously-determined elapsed time(s) spent handling error(s) in other part(s) of the media frame read from the memory; compare the aggregated elapsed time to a threshold representing a total acceptable latency; in response to the aggregated elapsed time not exceeding the threshold, handling error(s) in other part(s) of the media frame read from the memory; and in response to the aggregated elapsed time exceeding the threshold, send an error to a host without handling error(s) in other part(s) of the media frame read from the memory.

In some embodiments, the threshold is provided by the host.

In some embodiments, the threshold is one of a plurality of thresholds provided by the host for different media types, and wherein the controller is further configured to select the threshold based on a media type of the media frame.

In some embodiments, the threshold is provided by the storage system.

In some embodiments, the controller is further configured to determine the elapsed time spent by parsing at least one time reference in the media frame.

In some embodiments, the storage system further comprise a clock, and the controller is further configured to synchronize the clock with the at least one time reference parsed from the media frame.

In some embodiments, the at least one time reference comprises a program clock reference (PCR) or a presentation time stamp (PTS).

In some embodiments, the media frame is one of an audio frame and a video frame in a media file, and wherein the controller is further configured to parse the audio and video frames.

In some embodiments, the memory comprises a three-dimensional memory.

In another embodiment, a method is provided that is performed in a storage system comprising a memory. The method comprises reading a file from the memory; tracking a playback latency caused by correcting errors in the file; and in response to the tracked latency exceeding a threshold, performing a fast-fail operation.

In some embodiments, the threshold is provided by a host.

In some embodiments, the threshold is provided by the storage system.

In some embodiments, the file comprises an audio frame and a video frame, each associated with its own threshold, and wherein the method further comprises selecting the threshold based on whether the errors occurred in audio frame or in the video frame.

In some embodiments, the file comprises an audio frame and a video frame, and wherein the method further comprise parsing the audio frame and video frame.

In some embodiments, the playback latency is tracked from at least one time reference parsed from the file.

In some embodiments, the storage system further comprises a clock, and wherein the method further comprises synchronizing the clock with the at least one time reference parsed from the file.

In some embodiments, the at least one time reference comprises a program clock reference (PCR) or a presentation time stamp (PTS).

In another embodiment, a storage system is provided comprising a memory; means for tracking a playback latency caused by correcting errors in a media stream read from the memory; and means for, in response to the tracked playback latency exceeding a threshold, sending an error to a host without correcting error(s) in other part(s) of the media stream.

In some embodiments, the threshold is provided by the host.

In some embodiments, the threshold is provided by the storage system.

Other embodiments are possible, and each of the embodiments can be used alone or together in combination. Accordingly, various embodiments will now be described with reference to the attached drawings.

Embodiments

Figure 1B:
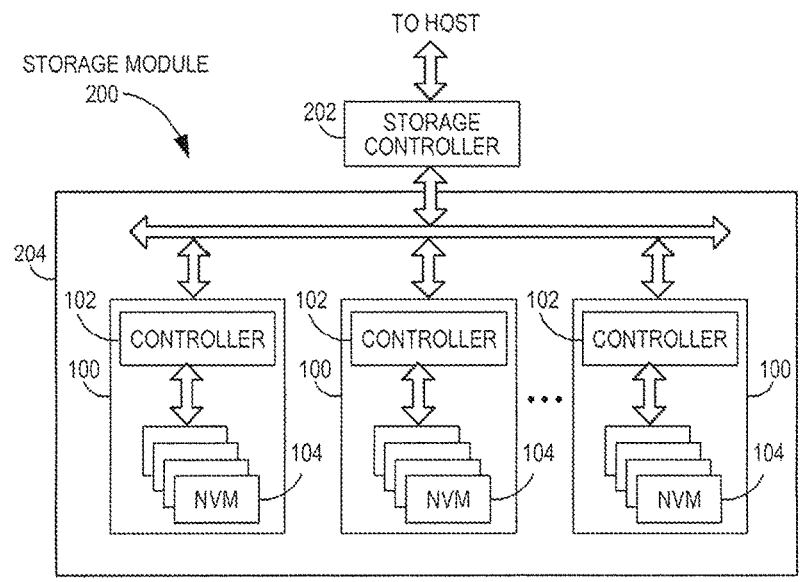
FIG. 1B is a block diagram illustrating a storage module of an embodiment.
Figure 1C:
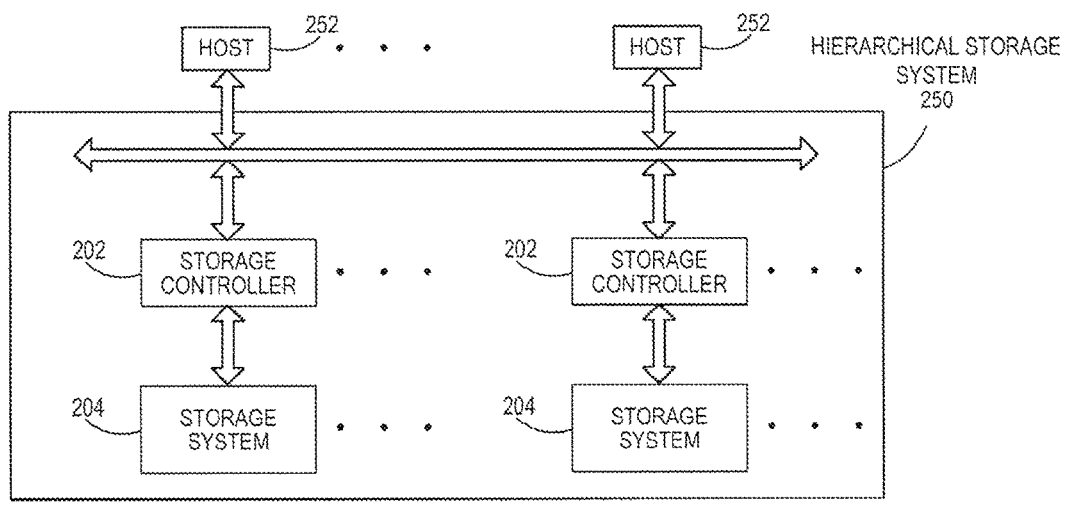
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
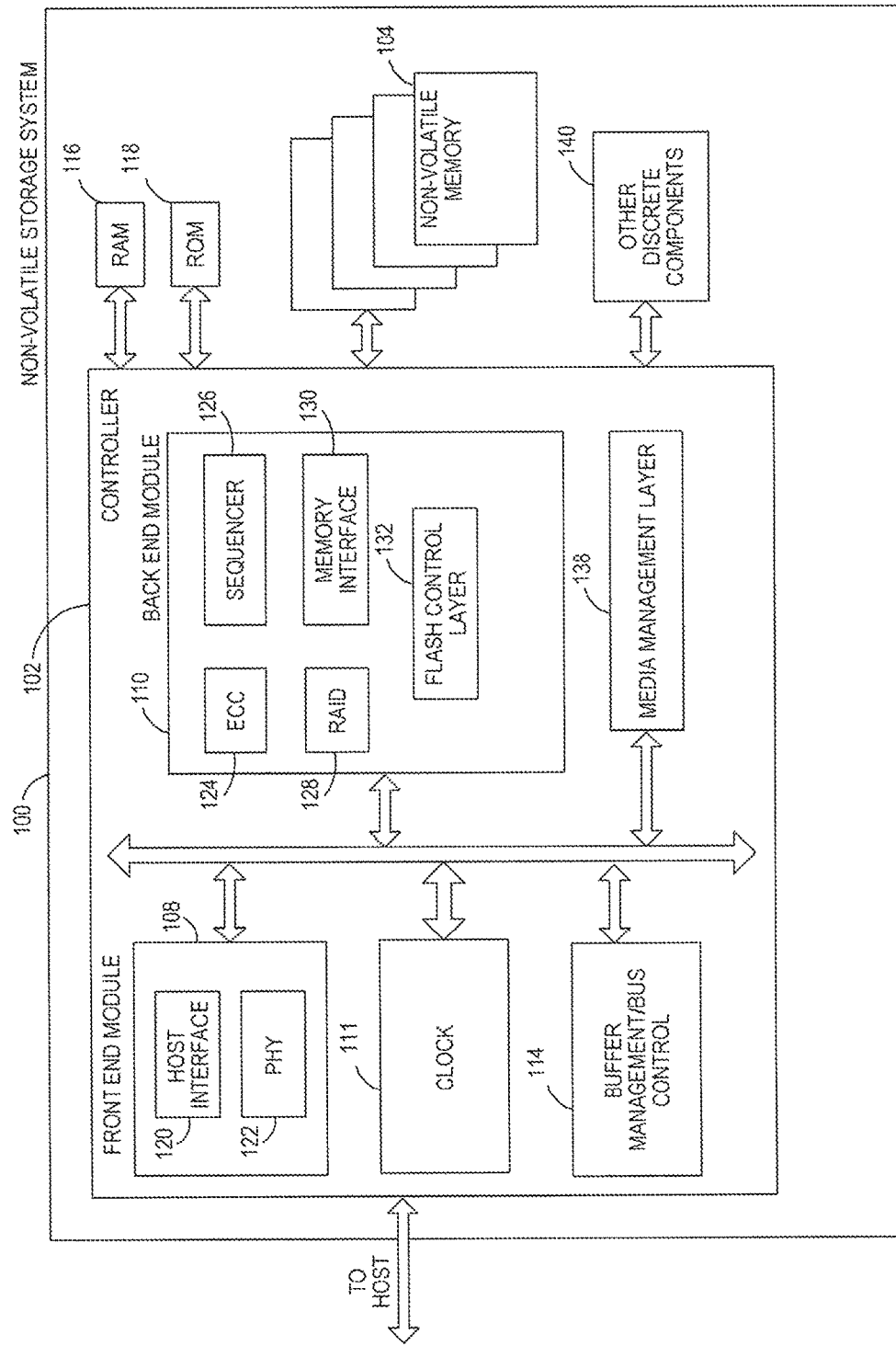
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a clock 111.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
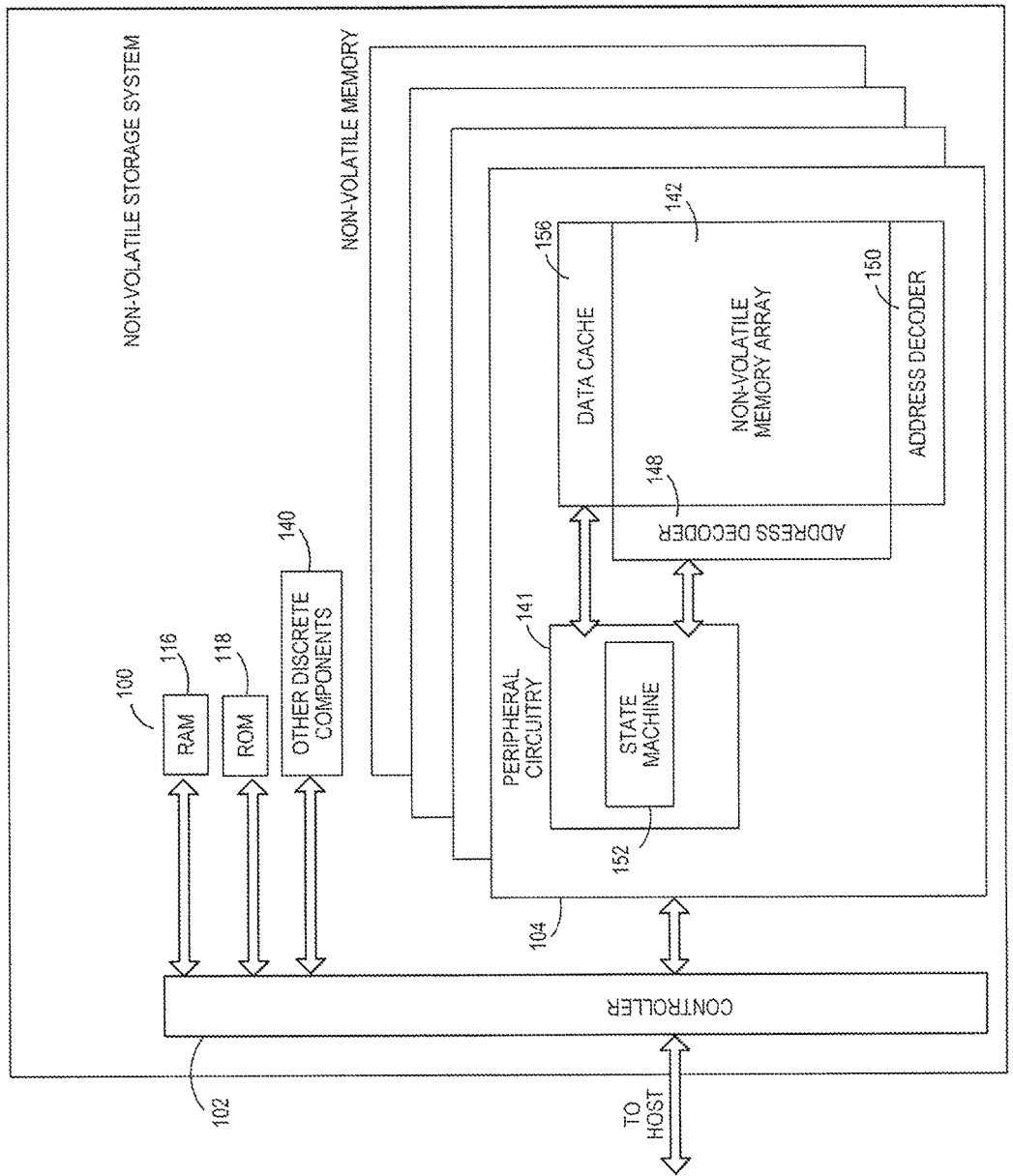
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
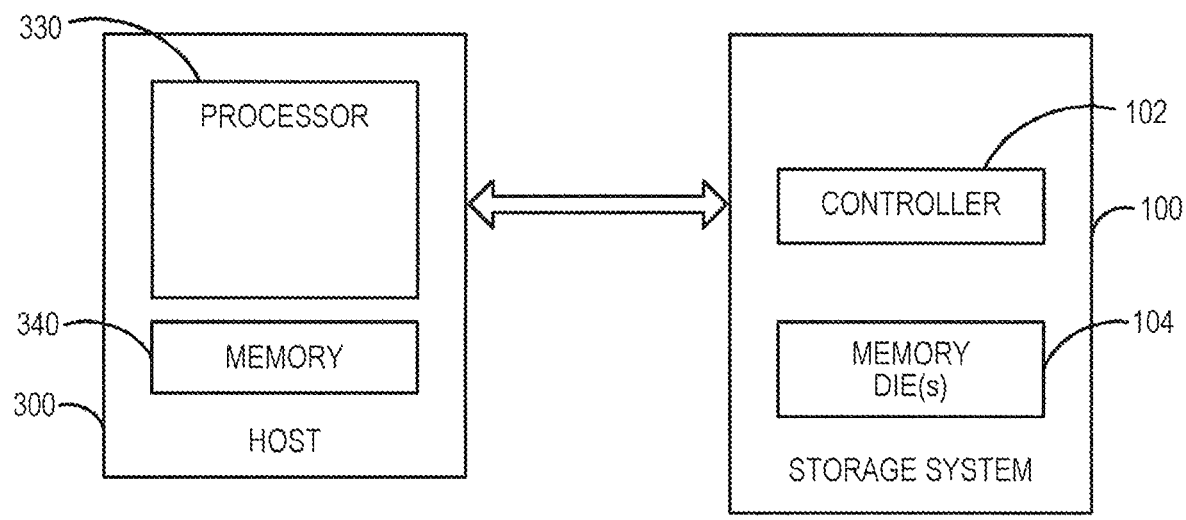
FIG. 3 is a block diagram of a computing device and storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to playback media read from the memory 104 of the storage system 100.

Some storage systems can be configured with the ability to determine whether to perform error correction or forego error correction ("fast fail") in order not to throttle the system. Typically, this involves applying a fixed threshold on a data fragment level. For example, the fast fail specification in NVMe in an endurance group applies for individual fragments in a region of memory. The fast fail is for the entire set of media data in that endurance group, irrespective of the media type.

The following embodiments recognize that this fixed threshold might be too strict in situations where additional latency may be tolerated. For example, in the context of synchronizing audio to video in a media file, a user may tolerate more delay and would prefer that delay over the alternative of receiving a playback error. So, latencies in a few fragments of a media frame may not impact the quality of service, as long as the sum of all such failure handling latencies of the media frame is within a playback presentation limit.

The following embodiments can be used to enhance the quality of service of the storage system during media data access. In general, in one embodiment, the controller 102 of the storage system 100 tracks a playback latency caused by correcting errors in the media frame. As used herein, a media frame can generally refer to a set of data of a media type (e.g., audio or video) that is continuously delivered one part at a time to a host for immediate playback. A media file can have both audio and video frames, and latencies can be caused by correcting errors in one or both of the frames. Because the parts of the audio/video data are meant to be consumed together, the media file containing such data is sometimes referred to herein as a stream.

In response to the tracked latency exceeding a threshold, the controller 102 executes a fast-fail operation. As used herein, a "fast-fail" operation refers to the stopping of correcting errors in read data. In the media frame context, this can result in an error sent to the host resulting in a playback error. As mentioned above, these embodiments can be used to reduce the number of fail-fails that the storage system 100 generates by comparing the latency caused by the handling the errors with a threshold.

Figure 4:
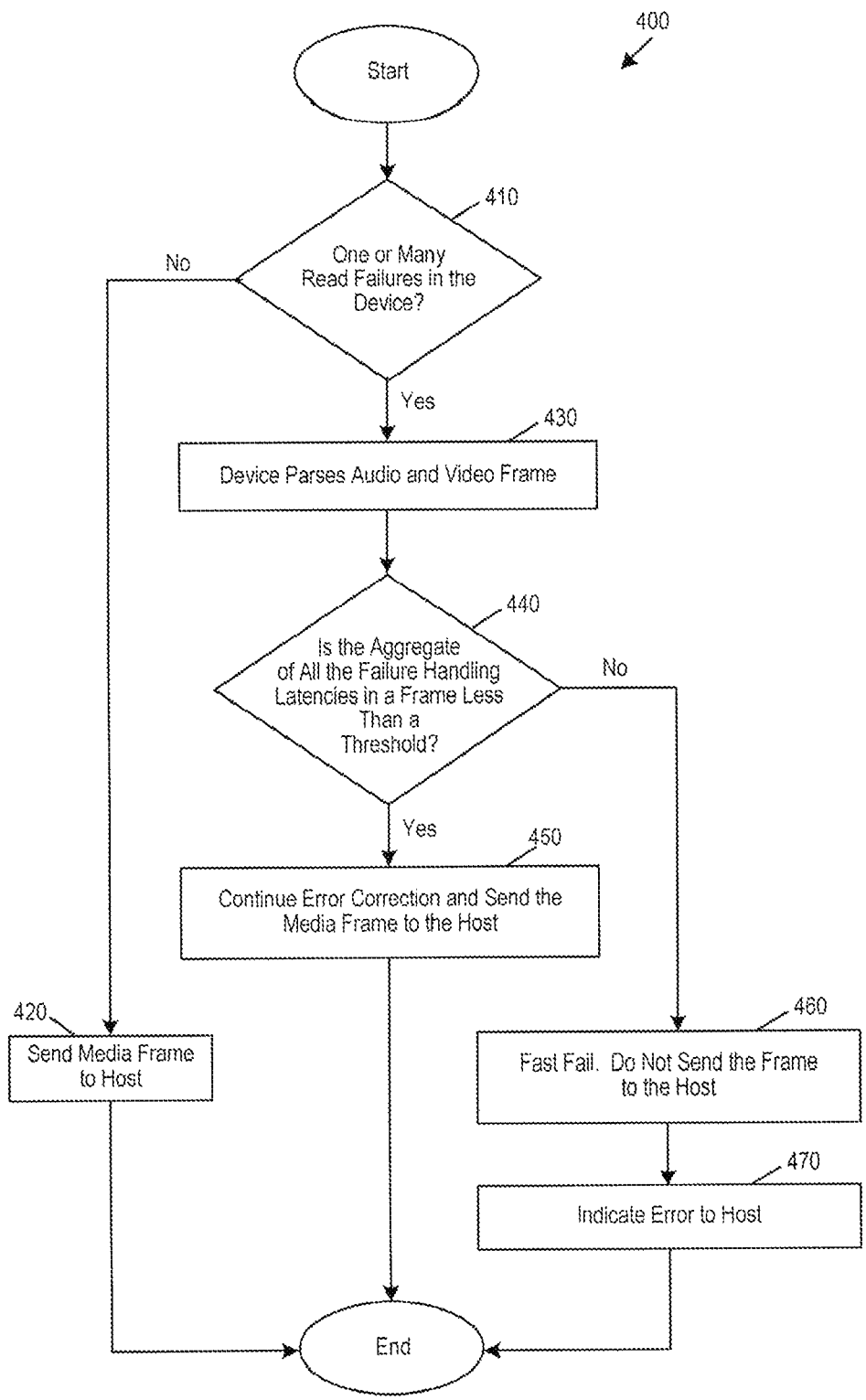
FIG. 4 is a flow chart of a method of an embodiment for media-based fast-fail configuration.

Returning to the drawings, FIG. 4 is a flow chart 400 of a method of an embodiment for media-based fast-fail configuration. As shown in FIG. 4, after receiving a request to playback a media file, the controller 102 of the storage system 100 reads the parts of a media frame for that media file from the memory 104 and determines if one or more read failures occurred in reading the data (act 410). For example, as the media data is read from the memory 104, error detection/correction mechanisms in the storage system 100 can determine that an error has occurred and can attempt to correct the error. If no errors are detected, the controller 102 can proceed with sending the media frame to the host that requested it for playback (act 420). If errors are detected, the controller 102 can parse the audio and video frames from the media file (act 430). As mentioned above, a media file can have both audio frames and video frames, and these separate frames can be parsed out for different treatment.

Next, the storage system 100 attempts to handle the detected errors in the various parts of the media frame read from the memory. On a read failure, the controller 102 can determine the elapsed time due to failure handling for data retrieval in each part of the media frame. The controller 102 can do this by parsing at least one time reference in the media frame. For example, during the read command, the controller 102 can parse a program clock reference (PCR) clock in a Moving Picture Expert Group (MPEG) transport stream (TS), which is typically used by a playback system to provide audio-video synchronization, and synchronize the storage system's internal clock 111 to the parsed PCR. As another example, the controller 104 can parse a presentation time stamp (PTS) of a failing frame to determine the latency caused by failure handling.

The controller 102 aggregates the determined elapsed time with previously-determined elapsed time(s) spent handling error(s) in other part(s) of the media frame read from the memory 104 (e.g., for burst flash failures in a media frame) and compares the aggregated elapsed time to a threshold representing a total acceptable latency (act 440).

In one embodiment, the threshold is provided by the host. For example, the host can provide the storage system 100 with different thresholds for different media types (e.g., audio, video), and the controller 102 can select the threshold based on a media type of the media frame being read. More specifically, the host can provide the storage system 100 with different acceptable frame latency configurations for different media types according to its audio-video sync application requirements, network delay, and/or its data buffering model, through a vendor-specific command. The host can provide this acceptable latency threshold for a full video frame or an audio frame in general, rather than at the fragment level (as mentioned above, the controller 102 can perform data segregation into video and audio frames). In operation, the controller 102 determines if the failing data is a part of a video frame or an audio frame. Based on the type of the media frame, the controller 102 evaluates if the total failure handling latency is nearing the threshold of corresponding host-provided latency.

Instead of being provided by the host, the threshold can be provided by the storage system 100. For example, the storage system 100 can be programmed with standard MPEG relative timing of within +40 milliseconds and −60 milliseconds (e.g., an audio frame can be ahead of its corresponding video frame by 40 milliseconds or behind by 60 milliseconds for a good user experience). The failing fragments get the non-failing fragments' time quota as a last-ditch effort. Determining both elapsed time and left out time enables the controller 102 to decide the further course of failure handling. In one embodiment, PTS parsing may only be required when the threshold is provided by the storage system 100, as parsing may not be required when the threshold is provided by the host.

Having the threshold be provided by the storage system 100 may be desired when the protocols used between the host and the storage system 100 do not have a mechanism for providing a vendor-specific command that the host can use to provide the threshold. Nevertheless, it may be desired to use a host-provided threshold if such a threshold takes into account the host's buffering model as well as the underlying application use cases. With use cases involving a network, the host may accommodate such network bandwidth delay as well into the presentation time stamp time.

Irrespective of the source of the threshold, the controller 102 uses the comparison of the aggregate latencies to the threshold to decide whether to perform read failure handling for the rest of the fragments in the failing media frame or simply perform a fail-fast operation so as to not throttle the system. So, if after comparing the elapsed time for a fragment to the time left to present that frame, the controller 102 determines that there is time available. In that case, the correction process continues, with many (or all) fragments in the frame being potentially recovered through extended failure handling mechanisms, while still meeting the latency criteria for a frame (act 450). In contrast, in response to the aggregated elapsed time exceeding the threshold, the controller can execute a fast-fail operation (act 460) to cease further error correction and send an error to the host (act 470). If the controller 102 decides to fast fail, the host can stub the media frame according to its design.

In some cases, the host may have poor buffering and/or tighter audio-visual sync requirements leading to a lesser recovery time in the storage system 100. In these cases, the storage system 100 may fail fast for those fragments in that frame. In the subsequent frame(s), the storage system 100 can try to recover as much as possible, as the new frame would have a different presentation time stamp.

Figure 5:
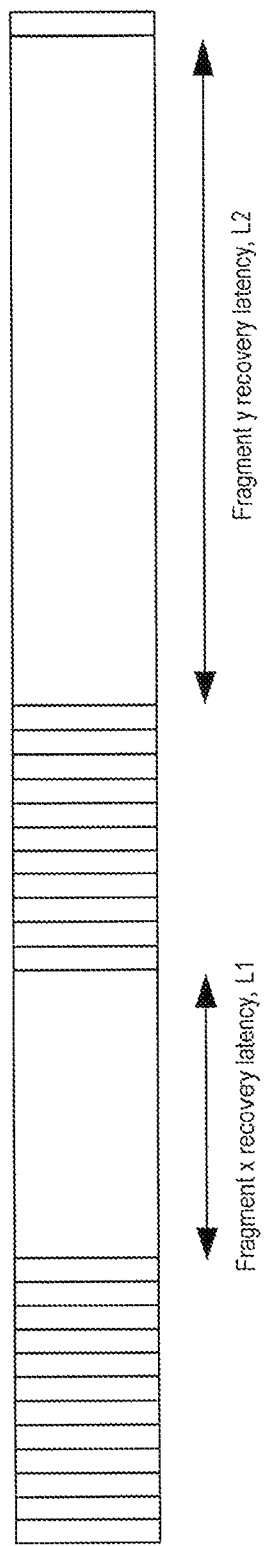
FIG. 5 is a diagram illustrating a media-based fast-fail configuration operation of an embodiment.

FIG. 5 is a diagram that illustrates an example of the above embodiments. In this example, the video frame size is 100 kilobytes (KB) and has 25 fragments (parts), which are 4 KB units. For fragment X recovery, the latency is L1. For fragment Y recovery, the latency is L2. L2 may be been considered for fast fail in typical systems but may be considered in the system of this embodiment if L1+L2 is less than the frame presentation threshold.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a memory; and
   a controller configured to:
      parse a time reference signal for audio-visual synchronization from a media frame;
      synchronize a clock of the storage system with the parsed time reference signal;
      receive a command from a host to read the media frame from the memory;
      parse a time stamp from the media frame, wherein the time stamp specifies a time allotted to present the media frame;
      use the synchronized clock to determine an elapsed time spent handling an error in a part of the media frame read from the memory;
      aggregate the determined elapsed time with previously-determined elapsed time(s) spent handling error(s) in other part(s) of the media frame read from the memory;

compare the aggregated elapsed time to the allotted time to present the media frame, as specified in the time stamp;

in response to the aggregated elapsed time not exceeding the allotted time, handle error(s) in other part(s) of the media frame read from the memory; and in response to the aggregated elapsed time exceeding the allotted time, perform a fast-fail operation to send an error to the host without handling error(s) in other part(s) of the media frame read from the memory.

2. The storage system of claim 1, wherein the controller is further configured to receive, from the host, a threshold representing a total acceptable latency.

3. The storage system of claim 2, wherein the threshold is one of a plurality of thresholds provided by the host for different media types.

4. The storage system of claim 1, wherein the controller is further configured to generate a threshold representing a total acceptable latency.

5. The storage system of claim 1, wherein the controller is further configured to parse audio frames and/or video frames from the media file.

6. The storage system of claim 1, wherein the memory comprises a three-dimensional memory.

7. The storage system of claim 1, wherein the time reference signal comprises a program clock reference (PCR) signal.

8. The storage system of claim 1, wherein the time stamp comprises a presentation time stamp (PTS).

9. The storage system of claim 3, wherein the controller is further configured to select one of the plurality of thresholds based on a media type of the media frame.

10. A method comprising:

performing the following in a storage system comprising a memory:

parsing a time reference signal for audio-visual synchronization from a media frame;

synchronizing a clock of the storage system with the parsed time reference signal;

parsing a time stamp from the media frame, wherein the time stamp specifies a time allotted to present the media frame;

receiving a command from a host to read the media frame from the memory;

using the synchronized clock to determine an elapsed time spent handling an error in a part of the media frame read from the memory;

aggregating the determined elapsed time with previously-determined elapsed time(s) spent handling error(s) in other part(s) of the media frame read from the memory;

comparing the aggregated elapsed time to the allotted time to present the media frame, as specified in the time stamp;

handling error(s) in other part(s) of the media frame read from the memory in response to the aggregated elapsed time not exceeding the allotted time; and performing a fast-fail operation to send an error to the host without handling error(s) in other part(s) of the media frame read from the memory in response to the aggregated elapsed time exceeding the allotted time.

11. The method of claim 10, further comprising receiving, from the host, a threshold representing a total acceptable latency.

12. The method of claim 10, further comprising generating a threshold representing a total acceptable latency.

13. The method of claim 10, wherein the file comprises an audio frame and a video frame.

14. The method of claim 13, further comprising parsing audio and video frames from the media file.

15. The method of claim 10, wherein the time reference signal comprises a program clock reference (PCR) signal.

16. The method of claim 10, wherein the time stamp comprises a presentation tine stamp (PTS).

17. The method of claim 11, wherein the threshold is one of a plurality of thresholds provided by the host for different media types.

18. The method of claim 17, further comprising selecting one of the plurality of thresholds based on a media type of the media frame.

19. The method of claim 10, wherein the memory comprises a three-dimensional memory.

20. A storage system comprising:

a memory;

means for parsing a time reference signal for audio-visual synchronization from a media frame;

means for synchronizing a clock of the storage system with the parsed time reference signal;

means for parsing a time stamp from the media frame, wherein the time stamp specifies a time allotted to present the media frame;

means for receiving a command from a host to read the media frame from the memory;

means for using the synchronized clock to determine an elapsed time spent handling an error in a part of the media frame read from the memory;

means for aggregating the determined elapsed time with previously-determined elapsed times) spent handling error(s) in other part(s) of the media frame read from the memory;

means for comparing the aggregated elapsed time to the allotted time to present the media frame, as specified in the time stamp;

means for handling error(s) in other part(s) of the media frame read from the memo in response to the aggregated elapsed time not exceeding the allotted time; and means for performing a fast-fail operation to send an error to the host without handling error(s) in other part(s) of the media frame read from the memory in response to the aggregated elapsed time exceeding the allotted time.

* * * * *